Nov. 26, 1963    J. PARKINSON    3,112,262
FILTER UNIT AND FILTER CARTRIDGE THEREFOR
Filed July 12, 1960

Inventor
JOHN PARKINSON
by: Cavanagh & Norman 3,112,262
FILTER UNIT AND FILTER CARTRIDGE
THEREFOR
John Parkinson, Toronto, Ontario, Canada, assignor, by mesne assignments, to New York Business Development Corporation, Albany, N.Y., a corporation of New York
Filed July 12, 1960, Ser. No. 42,294
2 Claims. (Cl. 210—130)

This invention relates to a filter unit and filter cartridge therefor.

Conventional filter construction for fluid filtering of gases and liquids used by internal combustion engines and the like are characterized by a filter pack or insert comprising a plurality of filter plates of expensive construction and of such form and construction that expensive structural support must be arranged therefor encasing same within the enclosing filter casing of the unit. It is customary therefore to replace only the filter elements or plates if only for the reason that discard of the casing would be unduly expensive. The design of prior filter casings for high pressure filtering is thus limited by the structural requirements necessary for the support of the filtering elements or plates.

It is the main object of this invention to provide a filter element structure which is inherently self-supporting and the structural integrity of which enables the same to be replaced within a relatively simple inexpensive casing which may if desired be replaced with the filter element as a unit for a new unit.

It is another object of this invention to provide a filter element the components of which imbue it with structural integrity sufficient to accommodate fluid under heavy and/or intermittent pressures and also at high temperatures.

It is a further object of the invention to provide a filter element comprising two filter membranes disposed in overlying relationship one next the other rolled up to form a filter roll of spiral configuration in sections about an axial tubular passage and built up thereabout to define a thick cylindrical-like body into which the fluid may be introduced at one end and out of which filtered fluid may flow from the other end.

Other objects of the invention will be appreciated by a study of the following specification taken into conjunction with the accompanying drawings.

Figure 1:
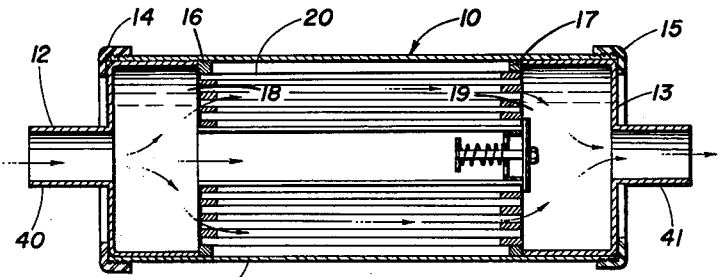
FIGURE 1 is a sectional view of a filter unit according to the invention.
Figure 2:
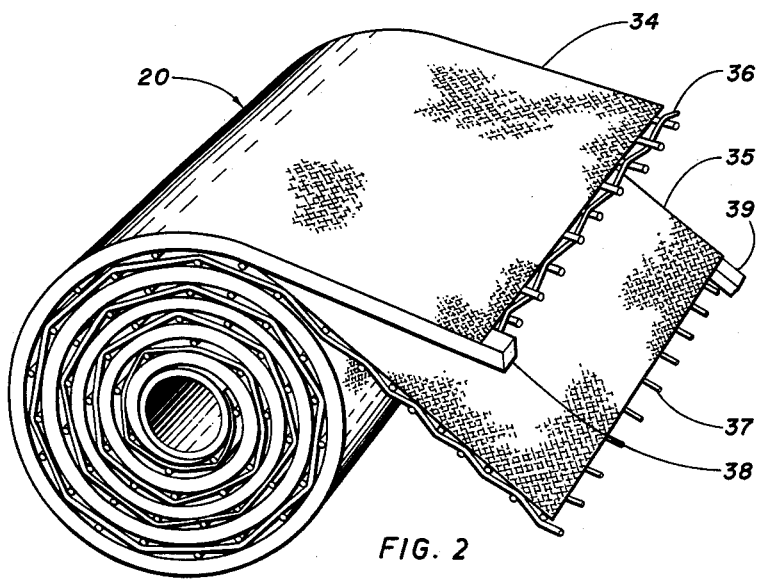
FIGURE 2 is a functional illustration in perspective of the mode of forming the filter element of the invention according to preferred practice herein set forth; and, FIGURE 3 is a sectional detail of the unit of FIGURE 1 enlarged to evidence the nature of the fluid flow therethrough.

The filter unit of the invention is generally indicated by the numeral 10 and comprises the tubular casing 11 having respective inlet and outlet fittings 12 and 13 retained therein by the threaded sleeve nuts 14 and 15.

Filter cartridge 20 is contained within casing 11, being separated therefrom by sealing rings 16 and 17 and retained in position by inner ends 18 and 19 of fittings 12 and 13 making sealing contact therewith.

Cartridge 20 comprises: an inner pressure relief tube or core 21 having a pressure relief valve structure 22 mounted within the outlet end 23 thereof. The pressure relief valve consists of a spider-like supporting web 24 set within tube 21 and retained therein by the inturned edges 25 of the outlet opening 26 thereof. The web 24 may be formed of a dish shape sheet metal member having a plurality of fluid conducting openings 27 therein. A piston valve element having a piston arm 28 and end flange 29 is biased by spring 30 against web 24 to retain the piston head 31 in spring-biased engagement against the seating surfaces 32 of the valve structure thus described by the outlet opening and valve member. By this means the pressure in direction of arrow Y overcoming the pressure of spring 30 will cause the valve to be opened allowing the direct flow of fluid through the pressure relief tube 21 from the inlet fitting 12 to the outlet fitting 13.

Figure 3:
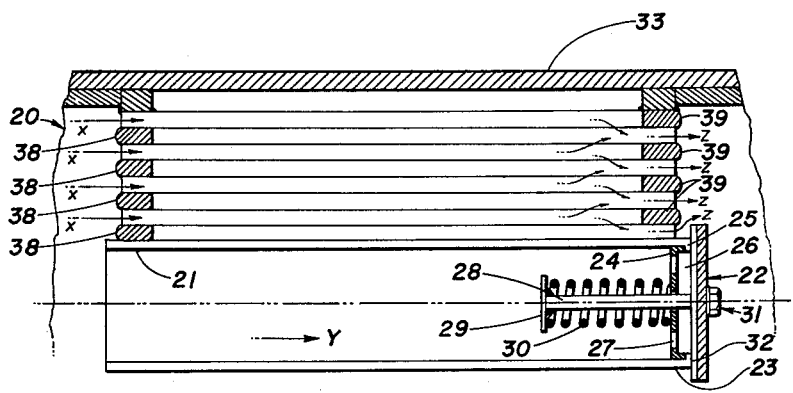

The filter element portion 33 of filter cartridge 20 is formed thereon by reeling two filter screens 34 and 35 having associated therewith the coarse supporting screens 36 and 37 respectively. Observe that the sealing member 38 is provided in association with screen 34 and at one edge thereof whereas a similar sealing member 39 is provided at the opposite edge of the other filter screen 35. Upon reeling assembly of the two screens and building up of the cartridge structure by reeling upon tube 21 there results an integral filter cartridge structure having the characteristics evident in FIGURE 3 wherein fluid flow may proceed therein by paths X to emit therefrom after passing through the filter screens by paths Z. Thus is developed a filter cartridge structure in which filter screen members formed of whatever material may be convenient are separated and structurally supported by a reinforcing web in the form of very coarse screen-like material or other relatively open but rigid structural means.

In order to ensure the necessary structural integrity in the filter cartridge itself to render the same inherently self-supporting throughout, it is preferred that the sealing strips 38 and 39 be cemented, welded, soldered or otherwise rigidly joined to the screen surfaces which they touch.

Each of the end fittings preferably embodies coupling means such as the threaded spouts 40 and 41 adapted for ready connection to a utilizing fluid line. When the filter cartridge becomes clogged with sediment to a degree raising the inlet pressure to a value overcoming the biasing pressure of spring 30, the relief valve opens and fluid then is conducted directly through the relief valve 21 thus by-passing the filter elements or screens of the cartridge 33. By reason of the simplicity of the construction of the entire filter unit, it will be apparent that the cost involved in discarding the unit as a whole will primarily be governed by the cost of cleaning or reclaiming the cartridge itself. It is also of interest to observe that by reason of the integral structural nature of the filter cartridge it is enabled to withstand substantial back-pressures which may be utilized in reverse flowing for cleaning purposes.

The filter element sheets 34 and 35 may be of stainless steel mesh, which may be sintered where desired, or of any suitable filter medium adapted to be supplied in sheet-like form in a relatively long strip adapted to be reeled upon a core as described. The invention contemplates that the filter element may be formed of sintered bronze formed by powdered metal techniques. Filter element sheets formed of fibrous materials may not be sufficiently strong for very high pressure service in spite of the substantial support provided, but nevertheless may be quite workable and highly desirable in some special applications. Filter elements formed of "plastic," for example, synthetic fibers may likewise be suitable in special applications. Ceramic or other heat-bonded foraminous sheets may also be reeled in the uncured state and then subjected to heat for curing in which event selection of a palatable supporting web or core tube will indicate materials of heat resisting properties in addition to the ordinary selection of suitable ceramics for such purpose.

Furthermore, in high temperature applications heat resistant ceramic or metallic filter elements can be formed with integral sealing members of like material thus eliminating the use of synthetic seals.

Having regard to the foregoing, it will be apparent that the invention generally concerns a filter element comprising in combination a core in the form of a tubular member adapted to accommodate fluid therethrough, at least one pair of mutually overlying filter element sheets in the form of a strip reeled upon itself on said core, web means between said pair and all overlying surfaces of said strip reeled upon itself on said core and adapted to communicate fluid therethrough between said sheets, and a sealing strip on a different edge of each sheet joining the latter to an underlying edge of an adjacent sheet edge surface throughout the length thereof when reeled on said core.

It is intended that the present disclosure should not be construed in any limited sense other than that limited by the scope of the following claims having regard to the teachings herein and prior art being apparent with the preferred form of structure disclosed herein and which reveals detail of structure of a preferred form necessary for a better understanding of the invention and may be subject to modification by skilled persons within the scope of the invention without departing from the concept thereof.

What I claim is:

1. A filter unit comprising in combination: a tubular core; at least one pair of mutually over-lying filter element sheets in the form of a strip of fine mesh stainless steel wire filter material reeled upon itself on said core; web means of coarse mesh material between said pair and all overlying surfaces of said strip separating and supporting the same reeled upon itself on said core and adapted to communicate fluid therethrough between said sheets; a sealing strip welded on a different edge of each sheet and to an underlying edge of an adjacent sheet edge surface throughout the length thereof when reeled on said core and preventing passage of liquid therebetween; a rigid tubular case extending about and contacting the exterior of said reeled sheets to define with the latter and said core a rigid filter cartridge and extending beyond either end thereof; first and second cup shaped end fittings for said cartridge inserted into said endwise extensions of said tubular case and abutting said rolled filter element sheets therewithin and defining with said endwise extensions of said case and said cartridge respective fluid chambers communicating with said core and the edges of said reeled sheets at both ends thereof; an inlet port located in said first end fitting along the central axis thereof, and an outlet port located in said second end fitting along the central axis thereof and coaxial with said inlet port and defining an axial flow path for fluid.

2. A filter unit comprising in combination: a core in the form of a rigid tubular member adapted to accommodate fluid therethrough; at least one pair of mutually overlying filter element sheets in the form of a strip of fine mesh stainless steel wire filter material reeled upon itself on said core; web means of coarse mesh material between said pair and all overlying surfaces of said strip separating and supporting the same reeled upon itself on said core and adapted to communicate fluid therethrough between said sheets; a sealing strip welded on a different edge on each sheet and to an underlying edge of an adjacent sheet edge surface throughout the length thereof when reeled on said core and preventing passage of liquid therebetween; sealing rings extending around said reeled strips at each end thereof; a one-way valve member in said tubular core; a rigid tubular case extending about and contacting the exterior of said reeled sheets to define with the latter and said core a rigid filter cartridge and extending beyond either end thereof; first and second cup-shaped end fittings for said cartridge fitting within said endwise extensions of said tubular case and contacting opposite ends of said rolled filter element sheets and defining with said cartridge respective fluid chambers communicating with said core and the edges of said reeled sheets at both ends thereof and abutting the respective ends thereof; retaining means threadedly engaging said casing and maintaining said end fittings in position within said endwise extensions of said tubular casing and preventing movement of said rolled filter element sheets; an inlet port located in said first end fitting along the central axis thereof, and an outlet port located in said second end fitting along the central axis thereof and co-axial with said inlet port and defining an axial flow path for fluid.

References Cited in the file of this patent

UNITED STATES PATENTS

| | | |
|---|---|---|
| 1,767,078 | Johnson | June 24, 1930 |
| 1,872,430 | Ericson | Aug. 16, 1932 |
| 2,106,218 | Krieck | Jan. 25, 1938 |
| 2,183,616 | Korte | Dec. 19, 1939 |
| 2,221,465 | Aldham | Nov. 12, 1940 |